United States Patent [19]
Collins et al.

[11] Patent Number: 5,624,760
[45] Date of Patent: Apr. 29, 1997

[54] FIRE RESISTANT GLASS

[75] Inventors: Brian J. Collins, Northampton; Graham B. Hinett, Reading; Michael W. Hayden; Martin E. Clarges, both of Northampton, all of Great Britain

[73] Assignee: Caradon Doors & Windows Limited - CET, Gloucestershire, Great Britain

[21] Appl. No.: 211,428

[22] PCT Filed: Oct. 12, 1992

[86] PCT No.: PCT/GB92/01858

§ 371 Date: Apr. 8, 1994

§ 102(e) Date: Apr. 8, 1994

[87] PCT Pub. No.: WO93/07099

PCT Pub. Date: Apr. 15, 1993

[30] Foreign Application Priority Data

Oct. 11, 1991 [GB] United Kingdom .................. 9121581

[51] Int. Cl.$^6$ .................................................. B32B 17/06
[52] U.S. Cl. ...................... 428/426; 428/66.7; 428/192; 428/220; 428/432; 428/920; 428/921; 52/306; 65/60.1; 65/60.5; 65/60.7; 65/117; 451/41; 451/44
[58] Field of Search ................ 451/41, 44; 65/117, 65/116, 60.1, 60.5, 60.7; 428/426, 432, 920, 921, 220, 192, 66.7; 52/306

[56] References Cited

U.S. PATENT DOCUMENTS

| | | | |
|---|---|---|---|
| 3,628,983 | 12/1971 | Leger | 428/81 |
| 3,637,362 | 1/1972 | Oelke | 65/25.2 |
| 4,756,124 | 7/1988 | Rossi | 451/5 |
| 4,968,563 | 11/1990 | Thomas | 428/432 |

FOREIGN PATENT DOCUMENTS

| | | |
|---|---|---|
| 0239280 | 9/1987 | European Pat. Off. |
| 0374000 | 6/1990 | European Pat. Off. |
| 2380997 | 9/1978 | France. |
| 2672081 | 7/1992 | France. |
| 558763 | 2/1975 | Switzerland. |
| 1524650 | 9/1978 | United Kingdom. |

OTHER PUBLICATIONS

Patent Abstracts of Japan, vol. 7, No. 56 (C–155) 8 Mar. 1982 & JP, A, 57 205 343 (Tokyo Shiba URA Denki KK) 16 Dec. 1982 Cited in the Application.

*Primary Examiner*—Ellis Robinson
*Assistant Examiner*—Timothy M. Speer
*Attorney, Agent, or Firm*—Oblon, Spivak, McClelland, Maier & Neustadt, P.C.

[57] ABSTRACT

Sheet glass (2) is rendered fire resistant such that it will not shatter under a build-up of heat to 900° C., by providing a thin coating (1) on one or both its surfaces, the coating being stable and adherent to the glass at up to 900° C., the coating preferably comprising an oxide, nitride, oxynitride or fluoride of a metal or of silicon, or a metal silicide, the sheet having been toughened by tempering before or after coating and having its edges (3) ground and polished before the tempering step to remove all imperfections therefrom.

13 Claims, 2 Drawing Sheets

FIRE RESISTANT GLASS

FIELD OF THE INVENTION

This invention relates to fire resistant glass.

DISCUSSION OF THE BACKGROUND

It is important in the design and planning of buildings, particularly offices and homes, to give consideration to prevention of the spread of fire. There are basically three types of fire resistant glass product which are currently used in buildings. Firstly, there is glass which is produced with a wire mesh or other fire resistant material cast or laminated into the structure which of course reduces the visibility through the glass. Whilst this type of glass easily breaks when subjected to heat and flames, the fire resistant material (eg. wire mesh) therein will hold the glass in place to resist spread of fire. This first type of glass product also has the disadvantage of permitting radiation of heat to the area beyond the glass. Secondly, there is clear glass which will not break for at least half-an-hour when subjected to intense heat in a test defined in British Standard BS 476, parts 20, 22 and others, i.e. upon build-up of heat to 900° C. This product will prevent the spread of flame but will not stop radiation of heat to the area beyond the glass. Thirdly, there is glass which will not break for at least half-an-hour when subjected to intense heat (as laid down by BS 476), and will also prevent the radiation of intense heat to the area beyond the glass. This product is currently produced in a series of laminates of glass and other materials which combine to prevent the conduction of heat.

The third type of glass (the laminated product) is generally expensive and heavy, and whilst the first type of glass is considerably cheaper, it is not usually aesthetically pleasing. The second type of glass can give good fire resistance without necessarily being very expensive, and whilst still being aesthetically pleasing.

There are two fire resistant products currently available which are of this second type. The first of these is a sheet of borosilicate glass. Borosilicate glass is of its nature relatively fire resistant. However, it cannot be satisfactorily toughened by tempering and thus does not meet certain "safety glass" requirements such as those of British Standard 6206A. Furthermore, borosilicate glass is more expensive than ordinary silica glass. The second product is a clear ceramic based product which has excellent fire resistance but has very poor optical quality and is not suitable as a simple replacement for ordinary window or panel glass.

It would be highly advantageous to be able to provide a fire resistant glass product of the second type described above, made from ordinary silica based glass since this is relatively inexpensive and it has excellent optical properties. However, silica based glass is not of itself fire resistant: it shatters when exposed to intense heat. Further, toughening the glass by tempering does not significantly affect its fire resistant properties: it still shatters when exposed to intense heat.

We have now found that a fire resistant product of the second type described above, can be made from silica based glass. Thus, we have devised a glass for use in buildings particularly where it is deemed desirable or necessary to prevent the rapid spread of fire and, at the same time, to give the appearance of a standard piece of "coated" glass. In particular, we have found a way in which such a fire-resistant glass can be made in a relatively simple and economic way.

DETAILED DESCRIPTION OF THE INVENTION

According to the present invention, there is provided a fire resistant sheet of glass, which has been toughened by tempering, and which has directly on at least one of its major surfaces a thin coating of a compound which is stable and adherent to the surface at temperatures up to 900° C., such that the coated sheet will not shatter under a build-up of heat to 900° C., the edges of the glass sheet having been ground to remove imperfections before the tempering.

The invention also provides a method of making a fire resistant sheet of glass which comprises applying to one or both major surfaces of a sheet of glass a thin coating of a compound which is stable and adherent to said surface at up to 900° C., the edges of the glass being ground and the glass being toughened by tempering before or after applying the coating(s), the resulting coated sheet being such that it will not shatter under a build-up of heat to 900° C.

The invention further provides a fire resistant construction unit for use in a building, which unit comprises a sheet of glass of the invention, mounted in a fire resistant steel or timber frame, using fire-resistant glazing materials, the sheet affording clear uninterrupted vision.

There have been various proposals in the prior art to form coatings on sheet glass. Apart from the well known provision of filters and the like, it is also known to form metal-containing coatings on a glass surface. GB-A-1524650 describes tempered glass sheets bearing an electrically conductive and heat reflective tin oxide film on each side for use in oven door window assemblies. The double-coated glass sheet has infra-red reflectance. However, this type of glass is not suitable for fire-resistant purposes because it will shatter when exposed to a build-up of heat to 900° C. Heat reflection is not the same as fire resistance: a glass sheet can be highly heat reflective by the presence of a metal-based heat reflective layer thereon, and yet have little or no fire resistance. GB-A-1565765 describes a method of providing a tin oxide film on glass, by pyrolysing an organic tin compound and suspending the powder in a gaseous fluorine compound carrier gas. As in GB-A-1524650, the coating gives some protection against heating by reflection of infra-red rays, but the coated glass is not suitable as a fire-resistant glass in buildings because under intense heat it will tend to shatter and so permit the spread of fire.

JP-A-57205343 describes the surface treatment of glass to improve its optical properties when used in solar batteries, liquid crystals, lasers etc. The glass surfaces are polished with an abrasive material in oil, and then heat-treated and immersed in molten $KNO_3$ to effect ion exchange. A film of indium oxide can then be applied. This coated glass is very expensive to produce and not suitable for fire resistance in buildings.

For the purposes of fire resistance, what is required is that a sheet of glass should remain whole and not fall to pieces when exposed to the intense heat of an adjacent fire. In this way, physical spread of the fire is prevented. We have found that by providing a particular novel combination of three features in a silica based sheet of glass, excellent fire resistance can be obtained. If one feature of the combination is omitted, the excellent fire resistance is lost.

Glass sheet in accordance with the present invention affords clear uninterrupted vision since the coating is thin and gives only a small level of visible reflectance. Thus, we have found that a sheet of glass can be rendered fire resistant without any significant loss of clarity of vision, by the relatively simple process of forming a thin transparent coating as defined above on one or both its surfaces, provided that two very important further requirements are met, namely that the edges of the glass are ground and that the sheet is toughened by tempering.

The nature of the glass itself is not critical but we prefer to use ordinary glass (i.e. silica based) as produced by the well-known patented float line process and conventionally used for both domestic and commercial applications. The thickness of the glass sheet is not critical. We normally use 6 mm sheet but other thicknesses can be used. The glass is cut using standard techniques and is tempered (toughened), preferably to BS 6206A, in a standard way. In the toughening process, the glass is tempered in a furnace using a cycle time necessary to heat the glass to a temperature of from 615° C. to 640° C., and then to cool it rapidly. This tempering (toughening) process is well known in itself and will not be further described herein. It creates a stress pattern through the product to achieve a break pattern conforming to BS 6206A. British Standard 6206A is a specification for impact performance requirements for flat safety glass and safety plastics for use in buildings. Reference should be made to the publication for further details.

The edges of the glass are ground to ensure that there are no imperfections such as "chips" or "shells". We have found that this is a critically important step, without which the glass will shatter as it is exposed to higher temperatures. It is therefore very important to remove edge imperfections from the sheet glass, and this step is effected before the tempering step.

When glass is to be toughened by tempering, it is known to apply coarse grinding to the edges just to remove relatively large irregularities. This is called edge "arrissing". The degree of grinding is small and far less than is required in the present invention. It is a preferred feature of the invention that the ground edges are also thereafter polished. Conventionally, polishing of glass edges is normally only used either to achieve a decorative effect or sometimes to make edges as safe as possible where they will be exposed in the final product. In the present invention, grinding can be effected, for example, using a diamond impregnated wheel, and polishing can be effected, for example, using a fibre wheel. Because of the importance of removing all edge imperfections, the edges should be inspected after treatment to ensure that they meet the stringent requirements of the invention.

The coatings of the invention can be formed in any convenient way, but we prefer to use plasma deposition processes such as sputtering, plasma enhanced chemical vapour deposition, chemical vapour deposition, evaporation or ion beam plasma deposition. Of these, sputtering is often the most convenient. The nature of these processes is well known and further description thereof will not therefore be given herein.

The coatings are formed directly on the glass surface. The nature of the coating can vary widely. We believe that any coating material can be used which is stable to the high temperatures encountered in fire resistance (eg. 900° C.) and which will adhere well to the glass surface under these conditions and in ordinary use. Among the preferred coating materials are oxides, nitrides, oxynitrides and fluorides of silicon or a metal, and metal silicides (including any mixture of two or more such materials). The particular choice of coating material will depend on circumstances such as cost and the application technique to be used. We prefer to use tin oxide and to apply it by sputtering, but there are many other possibilities including oxides or other compounds of aluminium, nickel, chromium, titanium, copper and alloys such as nickel-chromium alloys and stainless steel.

The thickness of the coating is preferably controlled to be the minimum required to give the desired fire resistance. This is advantageous both economically and also in that the thinner the coating, the less interference there is in visibility through the glass. Generally, the coating thickness will be in the range from 10 angstroms to 1 micron, with coatings usually in the lower end of this range. The reduction in visible light transmission due to the coating will normally be less than 10%. For tin oxide, the preferred minimum thickness is about 10 angstroms. It will be understood that the measurement of very thin metal oxide coatings is inherently imprecise and we intend to indicate the order of magnitude rather than any precise figure. The optimum thickness in any particular case can be determined by routine trial and experiment. We believe that the minimum thickness required to achieve the desired fire resistance is much the same for all the coatings which can be used.

In the method of the invention, the coating can be applied to the glass before or after the tempering step. However, the edge treatment must be effected before the tempering. Thus, for example, sheets of glass can be edged and tempered, and then coated or, alternatively, coated glass can be edged and then tempered.

The glass sheets of the invention can be coated on one side only, and provided this side is the one exposed to the fire, fire resistance will be obtained. However, it is usually much more convenient to coat both sides of the glass so that there are no restrictions of orientation in its final use.

The glass sheets of the invention are primarily intended for use in building construction to provide requisite fire resistance properties. Thus, they can be used for external or internal windows, for example, or in internal walls and screens, or other glazed units. Normally, they will be mounted in a fire resistant frame of metal or wood, using appropriate fire resisting glazing materials such as tapes and the like, so that the unit as a whole provides the desired fire resistance.

In order that the invention may be more fully understood, the following Examples are given by way of illustration only. In the Examples, reference is made to the accompanying drawings in which:

EXAMPLE 1

A 6 mm sheet of glass approximately 1 m square was edge ground and polished to remove any edge imperfections. The sheet was then tempered in a conventional tempering oven and quenched to achieve a break pattern conforming to BS 6206A. The toughened sheet was then coated on both faces with a thin coating of tin oxide using a vacuum DC magnetron sputtering plant. The sheet was first coated on one side, and then passed through the plant a second time to coat the other side. The coating thickness was about 10 angstroms.

Figure 1:
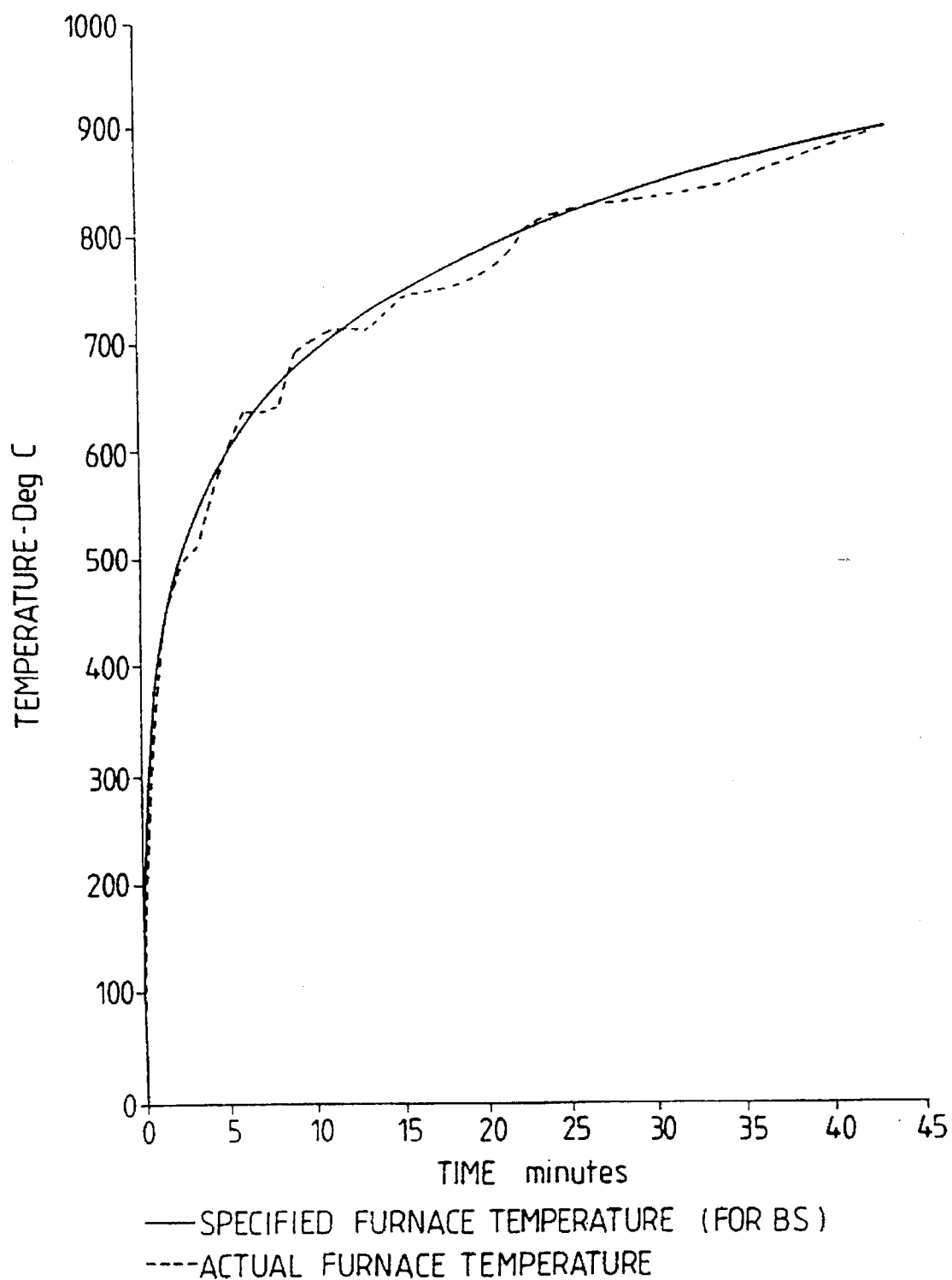
FIG. 1 is a graph of furnace temperature during testing of glass, against time.

The coated glass had the ability to withstand a build-up in heat to at least 900° C. as required by BS 476, without the coating burning off. (British Standard 476 relates to fire tests on building materials and structures and parts 20 and 22 thereof relate to methods for determination of the fire resistance of non-loadbearing elements of construction. Reference should be made to this publication of the British Standards Institution for further details.) The accompanying FIG. 1 shows the furnace temperature (the glass temperature will be virtually the same) during testing of the glass. The coating remained intact.

Figure 2:
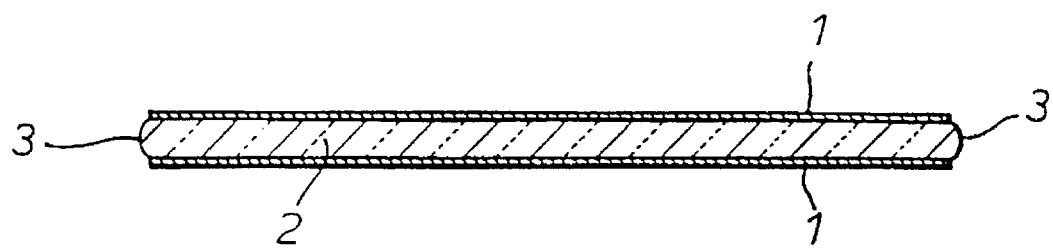
FIG. 2 is a section through one embodiment of sheet of fire resistant glass of the invention.
Figure 3:
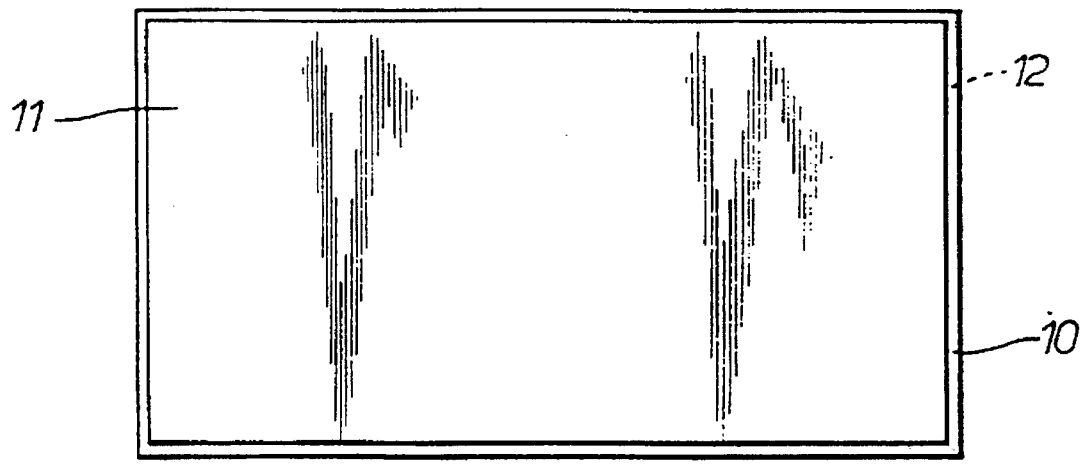
FIG. 3 is a plan view of an embodiment of construction unit of the invention, given by way of example only.

The accompanying FIG. 2 shows in section (but not to scale) the coated glass sheet of the Example. The thin tin oxide coatings 1 are present on the two faces of the sheet 2. The ground and polished edges 3 of the sheet are also shown. FIG. 3 shows a construction unit of the invention comprising a rigid rectangular steel or timber fire resistant frame 10 in which is mounted a sheet 11 of fire resistant glass of the invention. The glazing materials (12) are also fire resistant. The unit can of course be single or double glazed.

EXAMPLE 2

When the preparation of Example 1 is repeated, but with the omission of the edge polishing step so that there has only been a rough removal of sharp edges by coarse grinding, the resulting coated glass sheet does not have satisfactory fire resistance. The sheet shatters upon exposure to the heat as the temperature rises.

EXAMPLE 3

When the preparation of Example 1 is repeated using other oxides, and also nitrides, oxynitrides and fluorides of various metals and of silicon, the results obtained are similar to those of Example 1. In the case of sputtering silicon, a low frequency magnetron is used. The use of a coating of silicides is also very satisfactory.

EXAMPLE 4

A construction unit as described with reference to FIG. 3 herein was made up 3 m square and tested for fire resistance. The unit remained intact for over 30 minutes even at temperatures over 900° C.

What is claimed is:

1. A fire resistant coated sheet of glass, which has been toughened by tempering, comprising a glass sheet which has applied directly on at least one major surface of said sheet a coating of a compound which is stable and adherent to the surface at temperatures up to 900° C., such that the coated sheet will not shatter under a build-up of heat of 900° C., the edges of the glass sheet having been ground and polished to remove imperfections before tempering.

2. A coated sheet of glass according to claim 1, wherein the coating is an oxide, nitride, oxynitride or fluoride of a metal or silicon, a metal silicide.

3. A coated sheet of glass according to claim 2, wherein the coating is a metallic oxide selected from the group consisting of tin oxide, titanium oxide and chromium oxide.

4. A coated sheet of glass according to claim 1, 2 or 3, wherein said sheet has two major surfaces, and both major surfaces have said coating thereon.

5. A coated sheet of glass according to any of claims 1 to 3, wherein said sheet is made of silica glass which has been tempered by heating to 615° C. to 640° C. and then rapidly cooled.

6. The coated sheet as claimed in claim 1, wherein the thickness of the coating is from 10 angstroms to 1 micron.

7. A sheet of silica glass of thickness 4 to 8 mm which has been tempered to toughen it by heating to 615° C. to 640° C. and then cooled, wherein the glass meets the breakage requirements of BS 6206A, the edges of the sheet having been ground and polished to remove imperfections before tempering, and wherein each major face of the sheet has a coating of tin oxide sputter coated directly thereon such that the sheet will not shatter under a build-up of heat to 900° C., the sheet affording clear uninterrupted vision.

8. The sheet as claimed in claim 7, wherein the thickness of the coating is from 10 angstroms to 1 micron.

9. A method of making a fire resistant coated sheet of glass which comprises applying to one or both major surfaces of a sheet of glass a coating of a compound which is stable and adherent to said surface at up to 900° C. the edges of the glass being ground and polished and the glass being toughened by tempering before or after applying the coating(s), the resulting coated sheet being such that it will not shatter under a build-up of heat to 900° C.

10. A method according to claim 9, wherein the coating is effected by plasma deposition and said coating is an oxide, nitride, oxynitride or fluoride of a metal, silicon, or a metal silicide.

11. A method according to claim 9 or 10, wherein a metallic oxide coating is formed by sputter deposition.

12. The method as claimed in claim 9, wherein the thickness of the coating is from 10 angstroms to 1 micron.

13. A fire resistant construction unit for use in a building, which unit comprises a sheet of glass as claimed in any of claims 1, 2, 3 or 6, mounted in a fire resistant steel or timber frame, using fire resistant glazing materials, the sheet affording clear uninterrupted vision.

\* \* \* \* \*